United States Patent
Tsirkin et al.

(10) Patent No.: US 10,019,343 B2
(45) Date of Patent: Jul. 10, 2018

(54) KERNEL TRACING IN A PROTECTED KERNEL ENVIRONMENT

(71) Applicant: Red Hat Israel, Ltd., Raanana (IL)

(72) Inventors: Michael Tsirkin, Raanana (IL); Paolo Bonzini, Milan (IT)

(73) Assignee: Red Hat Israel, LTD., Raanana (IL)

( * ) Notice: Subject to any disclaimer, the term of this patent is extended or adjusted under 35 U.S.C. 154(b) by 322 days.

(21) Appl. No.: 15/052,938

(22) Filed: Feb. 25, 2016

(65) Prior Publication Data

US 2017/0249236 A1    Aug. 31, 2017

(51) Int. Cl.
*G06F 11/36* (2006.01)
*G06F 9/455* (2018.01)

(52) U.S. Cl.
CPC ...... *G06F 11/3636* (2013.01); *G06F 9/45558* (2013.01); *G06F 11/3664* (2013.01); *G06F 2009/45587* (2013.01); *G06F 2009/45591* (2013.01)

(58) Field of Classification Search
CPC .............. G06F 11/3636; G06F 11/362; G06F 11/3664; G06F 9/45558
See application file for complete search history.

(56) References Cited

U.S. PATENT DOCUMENTS

| 7,263,690 | B1 | 8/2007 | Shapiro |
| 7,996,836 | B1 * | 8/2011 | McCorkendale ....... G06F 21/53 |
| | | | 713/164 |
| 8,341,627 | B2 | 12/2012 | Mohinder |
| 8,359,422 | B2 | 1/2013 | Ali et al. |
| 8,402,441 | B2 | 3/2013 | Budko et al. |
| 8,832,682 | B2 | 9/2014 | Xu et al. |
| 2004/0064668 | A1 * | 4/2004 | Kjos .................... G06F 12/1027 |
| | | | 711/202 |
| 2009/0300263 | A1 * | 12/2009 | Devine ............... G06F 12/1009 |
| | | | 711/6 |
| 2014/0189687 | A1 | 7/2014 | Jung et al. |

(Continued)

OTHER PUBLICATIONS

Intel Corporation "Intel Kernel Guard Technology" https://01.org/intel-kgt/overview, accessed Dec. 9, 2015, 7 pages.

(Continued)

*Primary Examiner* — Jigar Patel
(74) *Attorney, Agent, or Firm* — Haynes and Boone, LLP (57) ABSTRACT

Methods, systems, and computer program products are included for performing tracing in a protected kernel environment. A method includes scanning at least a portion of a kernel to locate one or more instructions. The locations of the one or more instructions are provided to a hypervisor. The one or more instructions are replaced with one or more other instructions. After replacing the one or more instructions, a kernel protection feature is activated. After activating the kernel protection feature, they hypervisor detects an attempted modification of the kernel. The hypervisor determines that the attempted modification corresponds to the at least one location provided to the hypervisor and that the attempted modification corresponds to an authorized code variant. The hypervisor modifies the kernel to include the authorized code variant at the at least one location.

20 Claims, 4 Drawing Sheets

(56) References Cited

U.S. PATENT DOCUMENTS

2015/0046908 A1 2/2015 Salsamendi
2016/0110545 A1* 4/2016 Acar .................... G06F 21/554
　　　　　　　　　　　　　　　　　　　　　　　　　726/23

OTHER PUBLICATIONS

"Linux Kernel Tracing" https://burzalodowa.wordpress.com/2013/07/09/linux-kernel-tracing/, Jul. 9, 2013, 7 pages.
Nitin A. Kamble et al., "Evolution in Kernel Debugging Using Hardware Virtualization With Xen" https://www.kernel.org/doc/ols/2006/ols2006v2-pages-9-24.pdf, Open Source Technology Center, Intel Corporation, 2006, 18 pages.

* cited by examiner

KERNEL TRACING IN A PROTECTED KERNEL ENVIRONMENT

FIELD OF DISCLOSURE

The present disclosure generally relates to computer program debugging, and more particularly to systems and methods that provide kernel tracing in a protected kernel environment.

BACKGROUND

Conventional tracing technology allows users to analyze the operation of computer programs. For example, users may want to read data values at various execution times to identify a state of a computer program, write data values to particular memory locations, identify functions that are called, insert breakpoints to halt operation at particular code locations, and otherwise analyze the operation of a computer program. Tracing is useful for many activities, such as debugging. Debugging is a conventional activity that is performed using tracing technology to locate bugs/issues in computer programs and repair those bugs/issues.

Tracing technology allows tracing to be performed at the kernel level. For example, breakpoint instructions and function calls may be added and removed at various locations in kernel memory to allow analysis of the operation of the kernel. Users may, for example, identify events that are triggered in the kernel at various execution times, and otherwise trace the operation of the kernel.

Other conventional technologies that are used at the kernel level include kernel protection mechanisms. Kernel protection mechanisms allow enforcement of kernel protection measures that prevent the kernel from being modified. These mechanisms are useful for thwarting at least some malware and/or otherwise helping to safeguard the integrity of the kernel.

One issue that has arisen is that these kernel protection mechanisms are not compatible with tracing technology. That is, by preventing the kernel from being modified, the kernel protection mechanisms do not allow the kernel tracing features to be implemented in the kernel. For example, the tracing technology may be unable to insert and/or remove tracing mechanisms such as breakpoints and/or other tracing function calls into the kernel. Accordingly, while the kernel protection mechanisms may be helpful in some ways, they may also counter useful features that allow users to perform beneficial activities such as debugging.

It would be advantageous to allow tracing to be performed on the kernel, while at the same time allowing kernel protection mechanisms to be implemented. The techniques provided herein offer kernel tracing in a protected kernel environment.

BRIEF SUMMARY

This disclosure relates to computer program debugging. Methods, systems, and techniques for performing tracing of a kernel are provided.

According to an example, a method for performing tracing in a protected kernel environment includes scanning at least a portion of a kernel to locate one or more instructions; providing, to a hypervisor, at least one location corresponding to the one or more instructions; replacing the one or more instructions at the at least one location with one or more other instructions; after replacing the one or more instructions, activating a kernel protection feature; after activating the kernel protection feature, detecting an attempted modification of the kernel; determining, by the hypervisor, that the attempted modification corresponds to the at least one location provided to the hypervisor and that the attempted modification corresponds to an authorized code variant; and modifying, by the hypervisor, the kernel to include the authorized code variant at the location.

According to an example, a non-transitory machine-readable medium includes machine-readable instructions executable to cause a machine to perform operations comprising: scanning at least a portion of a kernel to locate one or more instructions; storing at least one location corresponding to the one or more instructions; replacing the one or more instructions at the at least one location with one or more other instructions; providing the at least one location and one or more authorized code variants to a hypervisor; after replacing the one or more instructions, activating a kernel protection feature; after activating the kernel protection feature, detecting an attempted modification of the kernel; determining, by the hypervisor, that the attempted modification corresponds to a location of the at least one location provided to the hypervisor and that the attempted modification corresponds to an authorized code variant of the one or more authorized code variants; and modifying, by the hypervisor, the kernel to include the authorized code variant at the location.

According to an example, a system includes a processor that executes a hypervisor to provide a virtual machine; the kernel that is runs on the virtual machine, the kernel to: scan at least a portion of a kernel to locate one or more instructions; store a location corresponding to the one or more instructions; replace the one or more instructions at the location with one or more other instructions; provide the location and an authorized code variant to the hypervisor; and activate a kernel protection feature; the hypervisor to: detect an attempted modification of the kernel; determine that the attempted modification corresponds to the location provided to the hypervisor and that the attempted modification corresponds to the authorized code variant; and modify the kernel to include the authorized code variant at the location.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
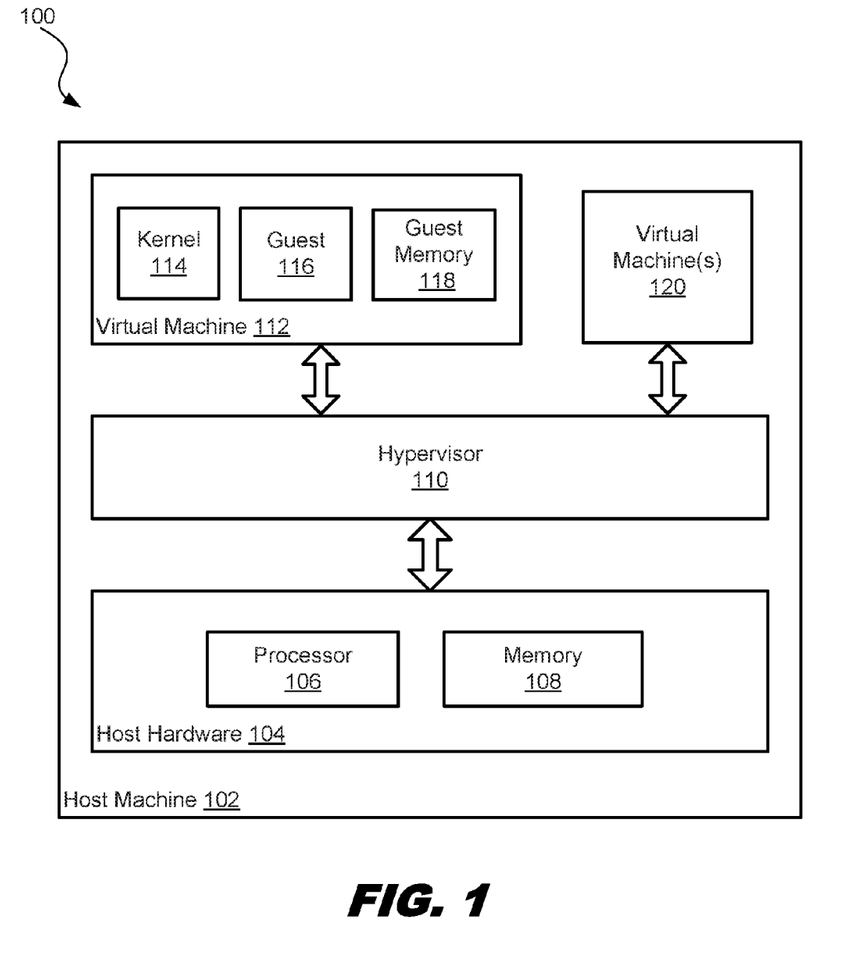
FIG. 1 is an organizational diagram illustrating a system that provides a protected kernel environment, in accordance with various examples of the present disclosure.

FIG. 1 is an organizational diagram illustrating a system that provides a protected kernel environment, in which various aspects of the present disclosure may be implemented.

The system 100 includes a host machine 102. The host machine 102 includes host hardware 104. Host hardware 104 includes physical elements such as a processor 106, memory 108, and may also include other input/output (I/O) devices, such as those illustrated in FIG. 4.

The host machine 102 includes a hypervisor 110, which also may be referred to as a virtual machine monitor. Hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

In the present example, hypervisor 110 provides one or more virtual machines, such as the virtual machine 112 and virtual machine(s) 120. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including access of virtual machines (e.g., virtual machine 112 and virtual machine(s) 120) to the host hardware 104, such as processor 106, memory 108, and other hardware devices. In some examples, the system resources that may be provided to each virtual machine include a virtual CPU that is mapped to the processor 106, guest memory that is mapped to a portion of the memory 108, one or more virtual devices that are mapped to other host hardware 104, such as a network device, an emulated NIC or disk, virtual firmware, and so forth.

In the present example, a kernel 114 runs on the virtual machine 112 provided by the hypervisor 110. The kernel 114 provides core computing functionality to the virtual machine 112. For example, kernel 114 is structured to manage important tasks, such as allocating guest memory 118, sending and receiving I/O, managing a file system provided to the guest 116, handling interrupts, scheduling and running processes to execute instructions of computing tasks, and/or provide other fundamental computing features.

In some examples, the virtual machine 112 is structured to include the kernel 114 as stand-alone kernel. However, in the present example, the virtual machine 112 is structured with the kernel 114 as well as a guest 116 that is built on top of the kernel 114 and relies upon the kernel 114 for allocating portions of the guest memory 118 to the guest 116 (and its applications) and executing instructions of the guest 116 (and its applications). The guest 116 may also be referred to as a guest operating system. Examples of guests include, for example, LINUX, UNIX, DOS, OS/2, IOS, ANDROID, WINDOWS, and so forth. These guests all include, at their core, a kernel (such as kernel 114) that handles allocation of memory and runs processes to execute instructions. The guest 116 may include features such as user interfaces (such as a desktop and/or command line interface), file systems, server applications, database management systems, tracing tools (including debugging applications), programming applications, and various other user applications that may be pre-installed on the guest 116 or added after installation of the guest 116.

Each virtual machine 120 may be similarly structured with a guest operating system that includes a kernel, and virtual memory that may be allocated by the kernel to the kernel itself, the guest operation system, and/or other applications.

The guest 116 running on a virtual machine 112 may include a same or a different operating system as a host operating system running on the host machine 102. For example, the guest 116 may provide an operating system that is accessed locally on the host machine 102 as a default operating environment of the host machine 102. In other examples, the host machine 102 is structured with an operating system that is separate from the guest 116, and the guest 116 is provided in addition to the host machine's operating system. Accordingly, the host machine 102 may run multiple operating systems concurrently and in isolation from other operating systems. Moreover, the guest operating systems of the host machine 102, virtual machine 112 and virtual machine(s) 112 may be homogenous or heterogeneous. That is, the guest operating systems may all be one type (e.g., LINUX) or may be different types (e.g., guest 116 may be RED HAT ENTERPRISE LINUX, and a virtual machine of the virtual machine(s) may include a guest that is another type of operating system).

The hypervisor 110 provides a guest memory 118 that is allocated to the kernel 114, guest 116, and/or other applications running on the virtual machine 112. In the present example, the guest memory 118 is structured as a virtualized portion of the memory 108. The guest memory 118 may include one or more guest memory pages that are mapped to memory pages of the memory 108 via one or more mappings, such as page tables. The mapping(s) may be provided by the hypervisor 110. As an example, page tables may include Extended Page Tables (EPT). Accordingly, the hypervisor 110 is structured with access to the guest memory 118 to virtualize the memory 108 and provide the guest memory 118 to the virtual machine 112. The guest memory 118, once allocated to the virtual machine 112 by the hypervisor 110, may have portions allocated by the kernel 114 to the kernel 114 itself, the guest 116, and/or other applications run on the virtual machine 112 by the kernel 114.

Further, the hypervisor 110 may also virtualize other areas of memory 108 for the virtual machines(s) 120 that are not mapped to the guest memory 116. These other areas of memory may therefore be inaccessible to the kernel 114 and/or guest 116. For example, the hypervisor 110 may also be structured to provide other guest memories to each of the virtual machine(s) 120 that are isolated from other guest memories. Accordingly, the hypervisor 110 is structured with access to the memory 108 to allocate and provide guest memory (e.g., guest memory 118 and/or other guest memories provided to the virtual machine(s) 120).

In the present example, the kernel 114 is structured to operate in a protected kernel environment, which may prevent at least some modifications to the kernel 114. For example, the kernel 114 may be structured to include KER- NEL GUARD TECHNOLOGY (KGT), which renders the memory pages and/or page table entries corresponding to the kernel 114 immutable in the virtual environment provided by the virtual machine 112. That is, the kernel 114, guest 116, and/or other applications running on the virtual machine 112 may be prevented from modifying the memory pages and/or page table entries that correspond to the kernel 114. Accordingly, in the present example, the guest 116 is prevented from inserting and/or removing instructions into the kernel 114 to perform tracing activities (including debugging) once the kernel protection feature is activated In the present example, the hypervisor 110 is structured with access to the guest memory 118, including page table entries and memory pages allocated to the kernel 114. The hypervisor 110 maintains this access even while the protected kernel environment is implemented. The hypervisor 110 is structured to communicate with the kernel 114, such as via hypercalls, system calls, shared memory, and/or interrupts, such that information may be passed between the hypervisor 110 and the kernel 114.

Figure 2:
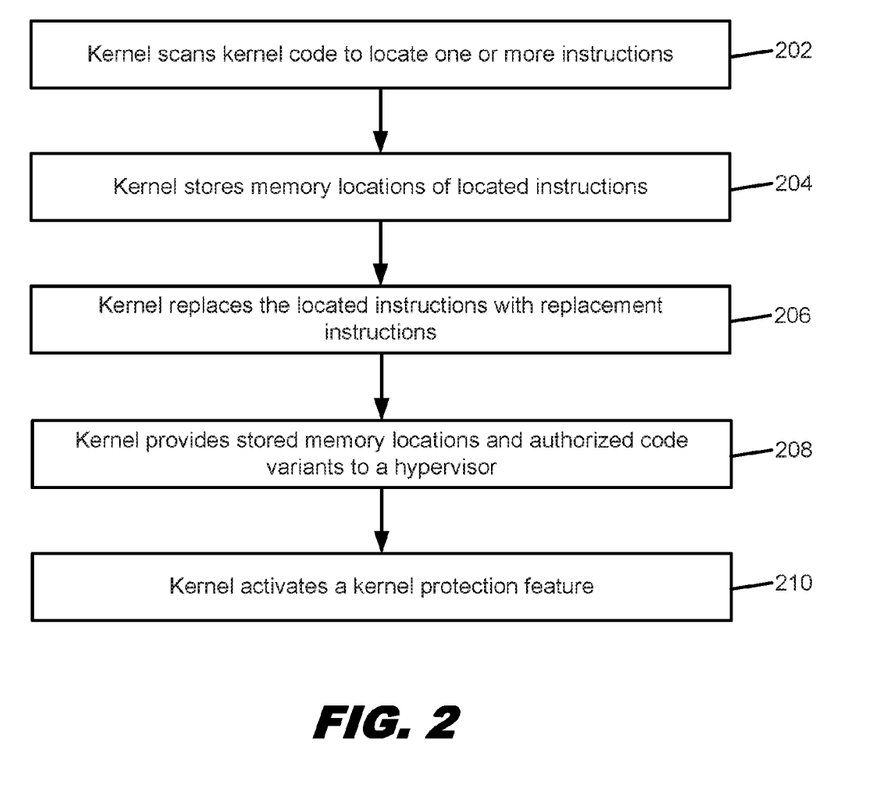
FIG. 2 is a flow diagram illustrating providing a hypervisor with locations for positioning authorized code variants, in accordance with various examples of the present disclosure.

FIG. 2 is a flow diagram illustrating a method for providing a hypervisor with locations for positioning authorized code variants, according to some examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 202, the kernel scans at least a portion of the kernel to locate one or more instructions. The portion of the kernel may include the entire kernel or one or more subsets of the kernel. In the present example, the kernel scan is performed during a boot process that includes loading the kernel into memory. In other examples, the kernel scan is performed during a loading of a kernel module and targeted to the particular kernel module. For example, the kernel may scan a module, such as a dynamically linked library, that is inserted into the kernel. In yet other examples, the scan may be performed outside of a boot process and/or module loading process.

In the present example, the kernel scanning includes matching instructions of the kernel with one or more instructions. The one or more instructions may be stored in a data structure, such as a list. The kernel may attempt to match each of the one or more instructions with each kernel instruction to determine whether the one or more instructions are included at particular memory locations of the kernel. In some examples, the scanning is performed in an order from a starting memory address to an ending memory address, where the starting address corresponds to the start of the kernel or a particular kernel module and where the ending memory address corresponds to the end of the kernel or a particular kernel module.

In the present example, the one or more instructions that the kernel scans for include mcount function calls and/or other tracing function calls, breakpoint instructions, No-Operation (nop) instructions, and/or other tracing-related/debugging-related instructions. These instructions may be referred to as code variants.

At action 204, for each location in memory that includes an instruction that matches the one or more instructions, the kernel stores the memory location. The memory location may include one or more memory addresses. In some examples, the memory locations are stored to a data structure, such as a list. The storing of the memory locations may be referred to as logging the memory locations. As an example, the memory addresses of the kernel that store mcount function calls (and/or other code variants) may be written to a list or other data structure. In some examples, in addition to storing one or more memory locations, the instruction(s) located at the one or more memory locations are also stored and associated with their corresponding memory locations. Accordingly, the log may include both memory locations where code variants are located as well as the particular code variant identified at each memory location.

At action 206, the kernel replaces the instructions that are identified as matches with the one or more instructions. This may be referred to as a code patching. In the present example, the code patching is performed during execution of the kernel (i.e., during runtime of the kernel). In the present example, the code patching includes writing one or more replacement instructions to the memory locations identified in action 204 as including matches.

In some examples, the replacement instructions may include, for example, one or more No-Operation (nop) instructions. For example, at each memory address of the kernel where an mcount function call (and/or other code variant) was located, the kernel may replace the mcount function call (and/or other code variant) with one or more replacement instructions (such as one or more nop instructions).

At action 208, the stored memory locations and one or more authorized code variants are provided, by the kernel, to the hypervisor. The authorized code variants may be the same or different than the code variants that the kernel scanned for in action 202. For example, the authorized code variants may include mcount function calls and/or other tracing function calls, breakpoint instructions, No-Operation (nop) instructions, and/or other tracing-related/debugging-related instructions. In some examples, the authorized code variants may include one or more code variants that were stored in association with memory locations in action 204. In other examples, the one or more authorized code variants may comprise one or more bytes with a fixed value together with zero or more bytes that can have an arbitrary (such as a non-fixed) value. In yet other examples, the one or more authorized code variants are included in a data structure, such as a list, that are pre-configured by one or more users and stored in the kernel.

In some examples, the kernel may provide the stored memory locations to the hypervisor, but not the authorized code variants. For example, the hypervisor may be configured to include the authorized code variants such that the kernel would not pass the authorized code variants to the hypervisor. The kernel may communicate memory locations and/or authorized code variants to the hypervisor together or in separate communications. The kernel and hypervisor may communicate, for example, via hypercalls, system calls, shared memory, and/or interrupts.

At action 210, the kernel activates a kernel protection feature. The kernel that includes the activated kernel protection feature may be referred to as a protected kernel environment.

In the present example, the kernel protection feature prevents modification of the kernel by the kernel itself and/or any tasks that are managed by the kernel. For example, the kernel, operating system running on top of the kernel, and/or other applications that are assigned tasks that are managed by the kernel are prevented by the kernel protection feature from writing to the kernel. In some examples, kernel protection feature prevents writes from being executed that modify (1) memory pages that are allocated to the kernel and/or (2) page mappings (such as page table entries) that correspond to the memory pages that are allocated to the kernel.

For example, within the context of FIG. 1, the kernel may correspond to kernel 114, the memory pages corresponding to the kernel may be allocated from the guest memory 118, and the programs that are prevented from writing to the kernel may include the kernel 114 itself, the guest 116, and/or other programs executing on the virtual machine 112.

In other examples, a kernel protection feature may include one or more other kernel protection features similar to and/or different than the kernel protection feature discussed above.

Figure 3:
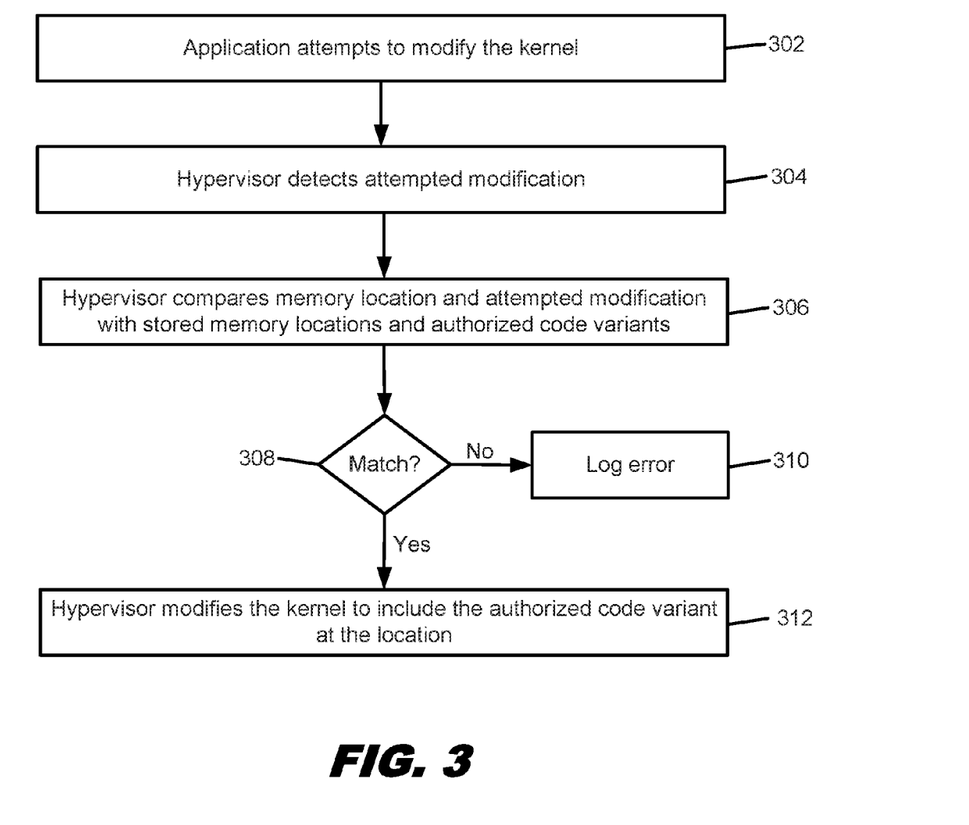
FIG. 3 is a flow diagram illustrating a hypervisor modifying a protected kernel to include an authorized code variant, in accordance with various examples of the present disclosure.

FIG. 3 is a flow diagram illustrating a method for modifying, by a hypervisor, a protected kernel to include an authorized code variant, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 302, an application attempts to modify the kernel. For example, the application may be attempting to insert instructions into a memory page allocated to the kernel. In another example, the application may be attempting to remove and/or change instructions that are included in a memory page that is allocated to the kernel. In yet another example, the application may be attempting to modify a page entry that is mapped to a memory page that is allocated to the kernel. The application may be, for example, the kernel itself, a guest operating system executing on the kernel, a tracing application (including a debugger), and/or other application running on top of the kernel and/or guest operating system.

In the present example, the attempted modification includes one or more instructions that are to be written to the kernel. In the present example, due to the kernel protection feature, the attempted modification is prevented by the processor from being executed. An error, such as an extended page table violation or other page fault is triggered by the attempted execution of one or more instructions corresponding to the attempted modification. In the present example, the error includes information corresponding to the error, such the one or more instructions that were attempted to be written and the location of the kernel where the instructions were to be written. In some examples, the location may be specified as one or more memory addresses and/or one or more page entries.

At action 304, a hypervisor detects the attempted modification. In the present example, the error triggers an error handler at the hypervisor, which executes instructions to respond to the error. For example, the processor may trigger an exception that is received by the hypervisor and processed at the error handler. Accordingly, the hypervisor detects the attempted modification to the kernel. In the present example, the particular modification (such as the instructions that were attempted to be inserted into the kernel) and the location(s) corresponding to the modification are received by the hypervisor for processing by the error handler. For example, an exception, interrupt, or other communication received by the hypervisor corresponding to the attempted modification may include or point to information that provides the location and particular modification instructions.

At action 306, responsive to the detected modification, the hypervisor compares the location corresponding to the attempted modification with one or more stored memory locations. For example, the particular memory addresses that were attempted to be modified may be compared with one or more memory addresses logged by the kernel and provided to the hypervisor at action 208. In some examples, the one or more memory addresses may be structured in a list or other data structure and compared with the memory addresses corresponding to the attempted modification one at a time, sequentially.

In the present example, the hypervisor also compares the attempted modification with one or more authorized code variants. For example, the attempted modification may include one or more instructions that were to be written to the kernel. These one or more instructions may be compared with a stored set of instructions that are authorized to be written. The stored set of instructions may be referred to as one or more authorized code variants. In some examples, these authorized code variants are provided to the hypervisor by the kernel, such as described with respect to action 208. In other examples, the hypervisor may be pre-configured with the one or more authorized code variants. In some examples, the one or more authorized code variants may be structured in a list or other data structure and compared with the one or more instructions corresponding to the attempted modification one at a time, sequentially. In other examples, the one or more authorized code variants may comprise one or more bytes with a fixed value together with zero or more bytes that can have an arbitrary (such as a non-fixed) value.

At action 308, if the location(s) and instruction(s) corresponding to the attempted modification match a stored memory location and an authorized code variant, action 312 is triggered responsive to detecting the match. Otherwise, action 310 is triggered responsive to detecting a failure to match the location(s) and instruction(s) corresponding to the attempted modification with a stored memory location and an authorized code variant.

At action 310, the hypervisor does not modify the kernel with the attempted modification. The hypervisor logs an error corresponding to the attempted modification.

At action 312, the hypervisor modifies the kernel to include the authorized code variant(s) at the location(s) corresponding to the attempted modification. For example, if the attempted modification corresponded to an attempt to write an mcount function call at a particular memory address, the hypervisor writes the mcount function call to the particular memory address.

Accordingly, mcount function calls and/or other tracing function calls, breakpoint instructions, No-Operation (nop) instructions, and/or other tracing-related/debugging-related instructions may be written to the kernel by the hypervisor to bypass one or more kernel protection features that would otherwise prevent the instructions from being written to the kernel.

Figure 4:
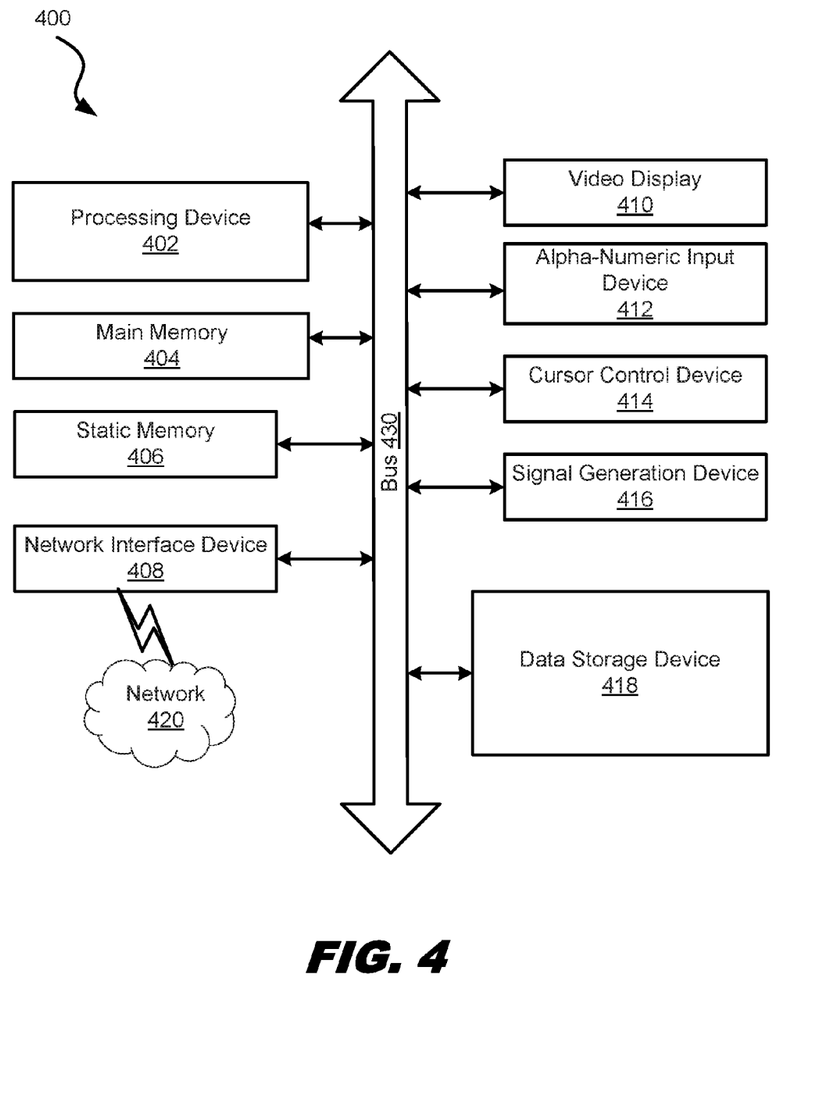
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 120.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing tracing in a protected kernel environment, the method comprising:
   scanning at least a portion of a kernel to locate one or more instructions;
   providing, to a hypervisor, at least one location corresponding to the one or more instructions;
   replacing the one or more instructions at the at least one location with one or more other instructions;
   after replacing the one or more instructions, activating a kernel protection feature;
   after activating the kernel protection feature, detecting an attempted modification of the kernel;
   determining, by the hypervisor, that the attempted modification corresponds to the at least one location provided to the hypervisor and that the attempted modification corresponds to an authorized code variant; and
   modifying, by the hypervisor, the kernel to include the authorized code variant at the location.

2. The method of claim 1, wherein the one or more instructions comprise at least one of an mcount function call, a breakpoint instruction, and a No-Operation (nop) instruction.

3. The method of claim 1, wherein the scanning is performed during a boot process.

4. The method of claim 1, wherein the scanning is performed during a load of a kernel module.

5. The method of claim 1, wherein an instruction of the one or more other instructions comprises a No-Operation (nop) instruction.

6. The method of claim 1, further comprising:
   providing, by the kernel, one or more authorized code variants to the hypervisor.

7. The method of claim 1, wherein the at least one location comprises one or more memory addresses that are allocated to the kernel.

8. The method of claim 1, wherein the detecting is performed by the hypervisor, the detecting comprising:
   triggering execution of a handler responsive to an extended page table (EPT) violation.

9. The method of claim 1, wherein the authorized code variant comprises at least one of an mcount function call, a breakpoint instruction, and a No-Operation (nop) instruction.

10. The method of claim 1, wherein the scanning is performed by the kernel.

11. The method of claim 1, wherein the kernel protection feature that is activated prevents the kernel from being modified by any task that is executed by the kernel.

12. The method of claim 1, wherein the attempted modification comprises an attempted write to a memory page that is allocated to the kernel.

13. The method of claim 1, wherein the attempted modification comprises an attempted write to a page table entry corresponding to a memory page that is allocated to the kernel.

14. The method of claim 1, wherein the authorized code variant comprises one or more bytes having a fixed value and one or more bytes having a non-fixed value.

15. A non-transitory machine-readable medium having stored thereon machine-readable instructions executable to cause a machine to perform operations comprising:
   scanning at least a portion of a kernel to locate one or more instructions;
   storing at least one location corresponding to the one or more instructions;
   replacing the one or more instructions at the at least one location with one or more other instructions;
   providing the at least one location and one or more authorized code variants to a hypervisor;
   after replacing the one or more instructions, activating a kernel protection feature;
   after activating the kernel protection feature, detecting an attempted modification of the kernel;
   determining, by the hypervisor, that the attempted modification corresponds to a location of the at least one location provided to the hypervisor and that the attempted modification corresponds to an authorized code variant of the one or more authorized code variants; and
   modifying, by the hypervisor, the kernel to include the authorized code variant at the location.

16. The non-transitory machine-readable medium of claim 15, wherein the one or more instructions comprise at least one of an mcount function call, a breakpoint instruction, and a No-Operation (nop) instruction.

17. The non-transitory machine-readable medium of claim 15, wherein the scanning is performed during a boot process or during a load of a kernel module.

18. The non-transitory machine-readable medium of claim 15, wherein the one or more authorized code variants comprise at least one of an mcount function call, a breakpoint instruction, and a No-Operation (nop) instruction.

19. The non-transitory machine-readable medium of claim 15, wherein the kernel protection feature that is activated prevents memory pages corresponding to the kernel and page table entries corresponding to the kernel from being modified by any task that is executed by the kernel.

20. A system comprising:
   a processor that executes a hypervisor to provide a kernel;
   the kernel to:
      scan at least a portion of the kernel to locate one or more instructions;
      store a location corresponding to the one or more instructions;
      replace the one or more instructions at the location with one or more other instructions;
      provide the location and an authorized code variant to the hypervisor; and
      activate a kernel protection feature;
   the hypervisor to:
      detect an attempted modification of the kernel;
      determine that the attempted modification corresponds to the location provided to the hypervisor and that the attempted modification corresponds to the authorized code variant; and
      modify the kernel to include the authorized code variant at the location.

* * * * *